United States Patent [19]
Tsukidate et al.

[11] Patent Number: 6,070,933
[45] Date of Patent: Jun. 6, 2000

[54] AUTOMOTIVE FRONT LOWER STRUCTURE

[75] Inventors: Hidetoshi Tsukidate; Takeshi Kakiuchi, both of Kanagawa-ken, Japan

[73] Assignee: Nissan Motor Co., Ltd., Kanagawa-ken, Japan

[21] Appl. No.: 08/840,046

[22] Filed: Apr. 24, 1997

[30]     Foreign Application Priority Data

Apr. 26, 1996  [JP]  Japan ................................. 8-107598
Oct.  1, 1996  [JP]  Japan ................................. 8-260925

[51] Int. Cl.$^7$ ................................................. B62D 35/02
[52] U.S. Cl. ...................... 296/180.1; 180/903; 180/68.1
[58] Field of Search .............................. 296/180.1, 180.5; 180/903, 98.1

[56]              References Cited

U.S. PATENT DOCUMENTS

| | | | |
|---|---|---|---|
| 2,719,053 | 9/1955 | McInnis | 296/180.1 |
| 4,772,060 | 9/1988 | Kretschmer | 296/180.1 |
| 5,322,340 | 6/1994 | Sato et al. | 296/180.1 |
| 5,692,796 | 12/1997 | Yamamoto et al. | 296/180.1 |

FOREIGN PATENT DOCUMENTS

| | | | |
|---|---|---|---|
| 2575126 | 6/1986 | France | 296/180.1 |
| 004024035 | 1/1992 | Germany | 296/180.1 |
| 60-23423 | 2/1985 | Japan . | |
| 63-16296 | 2/1988 | Japan . | |
| 4-15124 | 1/1992 | Japan . | |
| 4-129383 | 11/1992 | Japan . | |
| 406199252 | 7/1994 | Japan | 296/180.1 |
| 2051691 | 1/1981 | United Kingdom | 296/180.1 |

*Primary Examiner*—Joseph D. Pape
*Attorney, Agent, or Firm*—McDermott, Will & Emery

[57]             ABSTRACT

A novel automotive front lower structure is disclosed, in which the rear ends of left and right under covers are located symmetrically, so that the hot air in the drive unit mounting room is exhausted equally from the right and left rear ends of the under covers. Also, air spoilers arranged at the rear ends of the under covers improve the effect of negative pressure generation for an improved hot air exhaustion performance.

18 Claims, 7 Drawing Sheets

AUTOMOTIVE FRONT LOWER STRUCTURE

BACKGROUND OF THE INVENTION

The present invention relates to a front lower structure of an automobile comprising a drive unit mounting room arranged in the front portion of the vehicle body and under covers arranged under the drive unit mounting room.

An automobile is known, in which the lower portion of the drive unit mounting room of the front portion of the vehicle body is enclosed by under covers in order to improve the aerodynamic characteristics of the lower portion of the vehicle body and to prevent the intrusion of a splash into the drive unit mounting room, and in which the underfloor airflow from the front part under the engine room is rectified by the under covers for improved aerodynamic characteristics (for example, in Japanese Utility model Application Laid Open No. 4-129383, Japanese Utility model Application Laid Open No. 60-23423, Japanese Utility model Application Laid Open No. 63-16296 and Japanese Patent Application Laid Open No. 4-15124).

In recent years, however, the calorific amount of the engine tends to increase due to the measure taken to increase the output and to decrease the exhaust gas. Also, there is a demand for a lower target cooling water temperature of the radiator to improve the engine cooling performance. These facts make it more necessary to improve the exhaustion of the hot air from the engine room, which in turn requires a higher output of the cooling fan for a decreased cost effectiveness.

SUMMARY OF THE INVENTION

In view of this, the object of the present invention is to provide a front lower structure of an automobile capable of improving the exhaustion performance of the hot air in the drive unit mounting room without increasing the output of the cooling fan.

In order to achieve this object, according to this invention, there is provided a front lower structure comprising a drive unit mounting room arranged with a power unit and defined in the front part of the vehicle, a center member extending in the longitudinal direction of the vehicle under the transversal central portion of the drive unit mounting room, and a pair of under covers arranged on left and right sides of the center member for enclosing the front lower portion of the drive unit mounting room located under the front part of the power unit, wherein the rear ends of the left and right under covers each include an air spoiler bent to protrude downward, the air spoilers being located substantially symmetrically about the center member.

With this configuration, the rear ends of the left and right under covers are set symmetrically, and therefore the positions of negative pressure generation in the vicinity of the rear ends of the under covers are aligned in the transverse direction of the vehicle. Consequently, the hot air in the drive unit mounting room is discharged substantially equally rightward and leftward from the rear ends of the under covers. Also, the air spoilers at the rear ends of the under covers reduce the air flow under the under covers and increases the flow velocity thereof, thus increasing the negative pressure generated. As a result, the hot air is exhausted more positively, and the heat discharge performance of the drive unit mounting room can be further improved without increasing the output of the cooling fan. The thermal environment thus is improved and the radiator cooling water and the power steering oil can be cooled with a higher efficiency.

Also, since the heat is exhausted from the rear ends of the left and right under covers substantially equally, the axial line of the air flow under the drive unit mounting room is not disturbed so that the aerodynamic characteristics can be further improved.

Further, the air spoilers can be mounted with the protruded forward ends thereof set at a height between the ground clearance of the center member and the ground clearance of the front bumper.

With this configuration, the lower protruded ends of the air spoilers at the rear ends of the left and right under covers are set higher than the ground clearance of the center member, and therefore the damage which otherwise might be caused by the interference of the air spoilers with the road surface is avoided. In addition, since the lower protruded ends of the air spoilers are set lower than the ground clearance of the front bumper, the lower ends of the air spoilers can be arranged in proximity to the laminar flow area under floor uniquely determined by the lower surface position of the front bumper, thereby improving the effect of the negative pressure generation.

Also, the air spoilers may be arranged at positions not interfering with the mooring wires connected diagonally down rearward to the tie-down hooks arranged in the front end portion of the vehicle body.

With this configuration, even in the case where the mooring wires are coupled to the tie-down hooks in transporting the vehicle, the mooring wires do not damage the air spoilers by interfering with the air spoilers of the under covers, thereby improving the apparent quality and the reliability of the vehicle.

Also, the under covers can be formed with a pair of splash guards rising from the sides of the front wheels and a pair of slits extending forward of the bases of the bent portions of the air spoilers at the bases of the rising portions of the splash guards.

With this configuration, the base of the rising portion of the splash guard on the side of each under cover is formed with a slit extending forward of the base of the bent portion of the air spoiler. Even in the case where the air spoilers interfere with an obstacle on the road surface when the vehicle is driven backward, the slits permit free longitudinal deflection of the air spoilers and smooth escapement of the obstacle. As a result, neither the air spoilers nor the under covers are damaged from the portions thereof mounted on the vehicle body members.

Further, the air spoilers are preferably arranged rearward of a first cross member and forward of a power unit.

Furthermore, the protrusion of the air spoilers is preferably not less than 0.1 time longer than the length from the front end of the front bumper to the air spoilers.

What is more, the left and right air spoilers are preferably in such relative positions that the interval between them in the longitudinal direction of the vehicle is not more than ±125 mm.

According to another aspect of the invention, there is provided an automotive front lower structure comprising a drive unit mounting room defined in the front part of the vehicle and including a power unit and a pair of under covers for enclosing the lower side of the drive unit mounting room, wherein the under covers each include a splash guard rising from each side of each of the front wheels, a pair of air spoilers bent and protruded downward from the rear ends of the splash guards, and a pair of slits formed at the bases of the rising portions of the splash guards and extending forward of the bases of the bent portions of the air spoilers.

With this configuration, the air flowing in under the under covers from the front portion of the vehicle body while the vehicle is running is reduced and the flow rate thereof increased by the air spoilers bent downward of the ends of the under covers, thereby generating a high negative pressure in the vicinity of the air spoilers.

As a result, the differential pressure between the high negative pressure generated in the vicinity of the air spoilers and the internal pressure of the drive unit mounting room can positively cause the high-pressure hot air in the drive unit mounting room to flow out from the rear ends of the under covers. Thus the cooling performance of the radiator are improved without increasing the output of the cooling fan, while at the same time improving the cooling effect of the drive unit and other functional parts in the drive unit mounting room.

Also, since a slit extending forward of the base of the bent portion of each air spoiler is formed at the base of the rising portion of each splash guard on the side of each under cover, even in the case where the air spoilers interfere with an obstacle on the road surface when the vehicle moves backward, the slits cause a free longitudinal deflection of the air spoilers, so that the air spoilers can manage to avoid the obstacle. Consequently, the damage to the air spoilers can be prevented. Further, the under covers are prevented from being damaged from the portion thereof mounted on the vehicle body members.

Further, each under cover may include a readily-bent portion formed in the vicinity of the base of the bent portion of the air spoilers and extending in the transverse direction of the vehicle width behind the forming end of the slit.

With this configuration, the readily-bent portion extending in the transverse direction of the vehicle is formed in the portion of the under covers behind the forming end of each slit at a position in proximity to the base of the bent portion of the air spoilers. Even in the case where the air spoilers interfere with an obstacle on the road surface when the vehicle is driven backward, the readily-bent portion can more easily deflect the air spoilers in the longitudinal direction of the vehicle, and therefore the effect of preventing the damage to the under covers can be further improved.

Also, the under covers may include a pair of second splash guards bent rearward of the front wheel side ends of the air spoilers.

With this configuration, the second splash guards are bent rearward of the front wheel side edges of the air spoilers. Therefore, the splashes which may be sprung up from the front wheels are prevented from intruding the drive unit mounting room from the sides of the air spoilers and the functional parts in the drive unit mounting room are prevented from being inundated.

Further, the second splash guards improve the strength of the side ends of the air spoilers while at the same time eliminating the sideways exposure of the side ends for an improved the appearance.

Furthermore, the under covers are divided into the left portion and the right portion on both sides of the center member, and each of the left and right portions of the under covers is provided with an extension under the center member. The left and right extensions are overlapped in the longitudinal direction of the vehicle thereby to couple the left and right under covers.

With this configuration, even when the under covers are divided into left and right portions, the air spoilers of the respective portions are coupled to each other through the extensions under the center member, so that the resulting sense of continuity of the air spoilers improves the appearance.

Further, the under covers may include a recess for accepting the lower part of the power unit at the rear central portion thereof, a pair of second air spoilers bent downward from the forward end of the recess, and a pair of second slits formed on the extensions of the left and right side edges of the recess and extending forward of the bases of the bent portions of the second air spoilers.

With this configuration, the recess for accepting the lower side of the drive unit at the rear central portion of the under covers can also positively cause the hot air to flow out of the drive unit mounting room through the second spoilers formed at the forward end thereof, thereby improving the effect of cooling the drive unit mounting room. Also, the second slits permit the second air spoilers to be freely deflected in the longitudinal direction of the vehicle, and therefore the under covers can be prevented from being damaged by the interference which otherwise might occur with the road surface when the vehicle is driven backward.

Furthermore, each of the under covers can include a second readily-bent portion formed in the vicinity of the base of the bent portion of the second air spoilers and extending in the transverse direction of the vehicle between the second slits behind the forming end thereof.

With this configuration, even in the case where the second air spoilers at the forward end of the recess come to interfere with the road surface when the vehicle is driven backward, the second air spoilers can be easily deflected in the longitudinal direction of the vehicle due to the presence of the second readily-bent portion, and therefore the under covers can be prevented from being damaged more effectively.

DESCRIPTION OF THE PREFERRED EMBODIMENTS

A first embodiment of the present invention will be explained in detail below with reference to the accompanying drawings.

Figure 1:
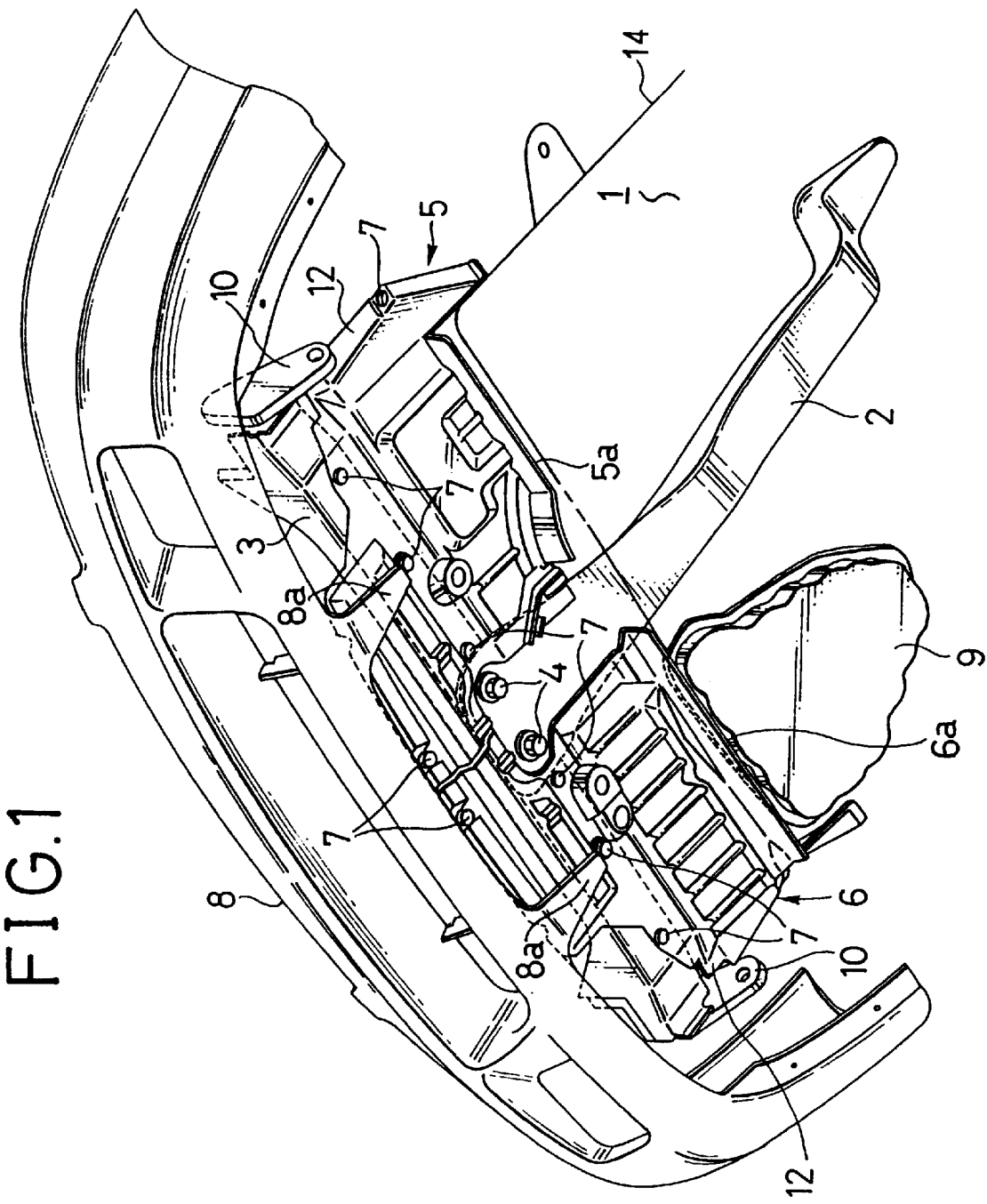
FIG. 1 is a perspective view of the front lower structure as viewed from the bottom thereof according to a first embodiment of the present invention.
Figure 2:
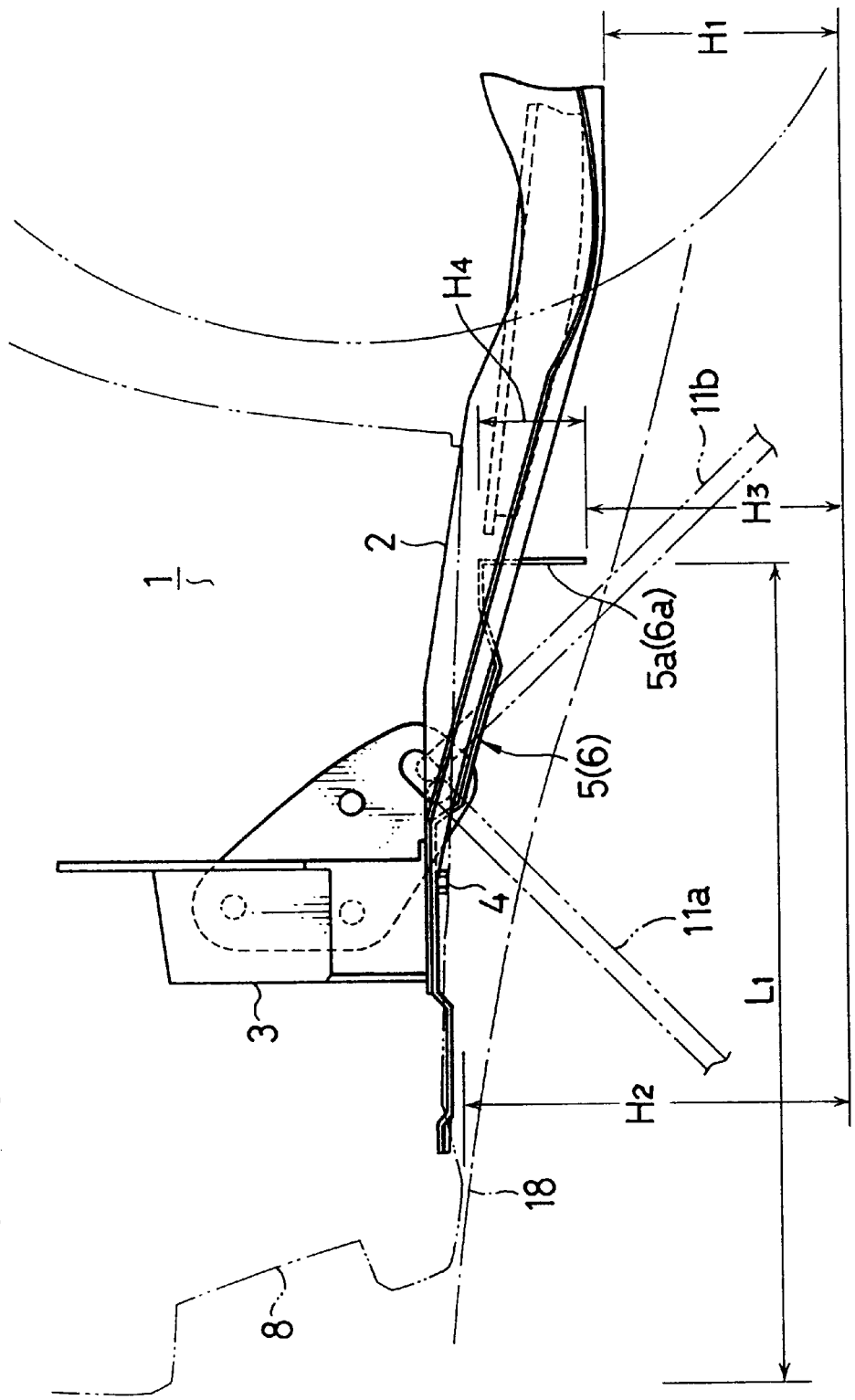
FIG. 2 is a side view of the essential parts of the front lower structure shown in FIG. 1.

As shown in FIGS. 1 and 2, a F.F (front-engine front-drive) vehicle has an engine room 1 defined in the front portion of the vehicle body thereof as a drive unit mounting room. A center member 2 extending in the longitudinal direction of the vehicle body is arranged under the lower central part of the engine room 1. A first cross member 3 crossing the center member 2 and extending in the transverse direction of the vehicle is arranged under the front part of the engine room 1. The central portion of a power unit 14 (shown schematically) including the engine and the transmission not shown is mounted on the center member 2.

The front end of the center member 2 extends in the transverse direction of the vehicle and is securely fastened by bolts and nuts 4 to the lower surface of the first cross member 3. The rear end of the center member 2 is also securely fastened to the lower end of a subframe not shown.

Two under covers 5, 6 are arranged under the engine room 1. The under covers 5, 6 are arranged on the left and right sides, respectively, of the center member 2 in front of the power unit and enclose the lower front portion of the engine room 1.

The under covers 5, 6 are formed of a heat-resistant, oil-resistant and weather-proof flat steel or synthetic resin plate. Splash guards 12, 12 are formed rising on the front wheel sides of the under covers 5, 6 not shown. The front ends of the under covers 5, 6 are secured to the lower surface of the first cross member 3 by fixing means 7 such as clips or bolts and nuts. The front ends of the transversal central portions of the under covers 5, 6 are secured by similar fixing means 7 to the lower edge of the front bumper 8. Further, the splash guards 12, 12 at the side ends of the under covers 5, 6 are secured by the fixing means 7 respectively to front side members not shown through a bracket.

The lower central edge portion of the front bumper 8 is secured by the fixing means 7 to the first cross member 3 together with the under covers 5, 6 through brackets 8a, 8a extending rearward.

The left and right under covers 5, 6 have the rear edges thereof arranged symmetrically. According to this embodiment, for example, the under covers 5, 6 are aligned substantially in the transverse direction of the vehicle at a position in proximity to the front portion of the oil pan 9 of the transmission. The rear ends of the under covers 5, 6 are formed with air spoilers 5a, 6a protruded downward. The air spoilers 5a, 6a are arranged forward of the power unit rearward of the first cross member 3.

According to this embodiment, the side of the rear edge of the under cover 5 nearer to the center member 2, which is arranged on the front part of the engine of the power unit, is formed arcuate forward together with the air spoiler 5a for avoiding the interference with an exhaust tube not shown.

As shown in FIG. 2, the protruded lower edges (forward ends of the protrusions) of the air spoilers 5a, 6a are set at a ground clearance H3 between a ground clearance H1 of the center member 2 and a ground clearance H2 of the front bumper 8 in order to avoid the interference with the road surface and to improve the effect of negative pressure generation. The height H3 is preferably slightly higher than the ground clearance H1 of the center member 2 so that the lower edges of the air spoilers 5a, 6a approach the laminar flow area 18 of the underfloor air flow uniquely determined by the position of the lower surface of the front bumper 8.

Also, the vehicle, when transported on a trailer or a vessel, is securely fixed to the floor surface of the transportation means by coupling tie-down hooks 10 (FIG. 1) on the front and rear portions of the vehicle body to mooring wires 11a, 11b (FIG. 2), respectively. In the case where the rear edges of the under covers 5, 6 are formed with the air spoilers 5a, 6a bent downward, as described above, however, the mooring wire 11b coupled diagonally down rearward to the tie-down hook 10 joining the front side member not shown is liable to interfere with the air spoilers 5a, 6a.

In view of this, according to this embodiment, the protruded lower edges of the air spoilers 5a, 6a are set at the ground clearance H3 approaching the ground clearance H1 of the center member 2 between the ground clearance H1 of the center member 2 and the ground clearance H2 of the front bumper 8, while at the same time setting it at a position free of interference with the mooring wire 11b coupled diagonally down rearward to the tie-down hook 10.

Figure 3:
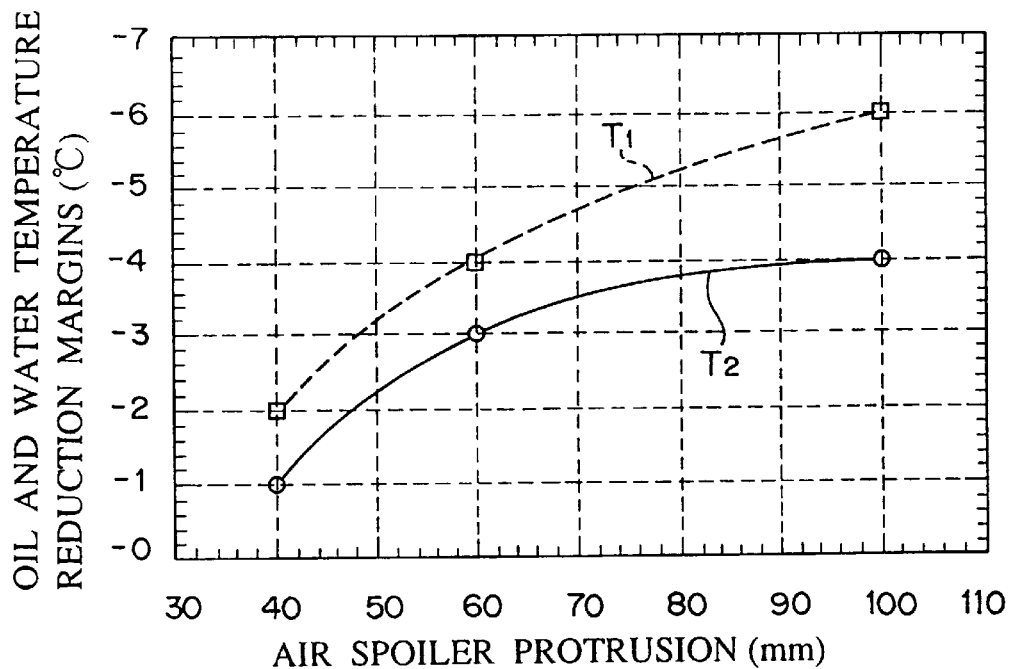
FIG. 3 is a diagram showing the relation between the amount by which the air spoilers are protruded, the reduction margin of the power steering oil temperature and the reduction margin of the radiator cooling water temperature.

Further, the amount of protrusion H4 of the air spoilers 5a, 6a is set to at least 0.1 time as large as the length L1 from the front end of the front bumper 8 to the air spoilers 5a, 6a. This is by reason of the fact that the oil temperature and the water temperature have been found to drop effectively when the amount of protrusion H4 of the air spoilers 5a, 6a is not less than 50 mm as shown in FIG. 3, as a result of an experiment conducted by changing the amount of protrusion H4 of the air spoilers 5a, 6a to determine the reduction margin T1 of the power steering oil temperature and the reduction margin T2 of the radiator cooling water temperature with the length L1 from the front end of the front bumper 8 to the air spoilers 5a, 6a set to 435 mm while maintaining constant relative longitudinal positions of the left and right air spoilers 5a, 6a.

Figure 4:
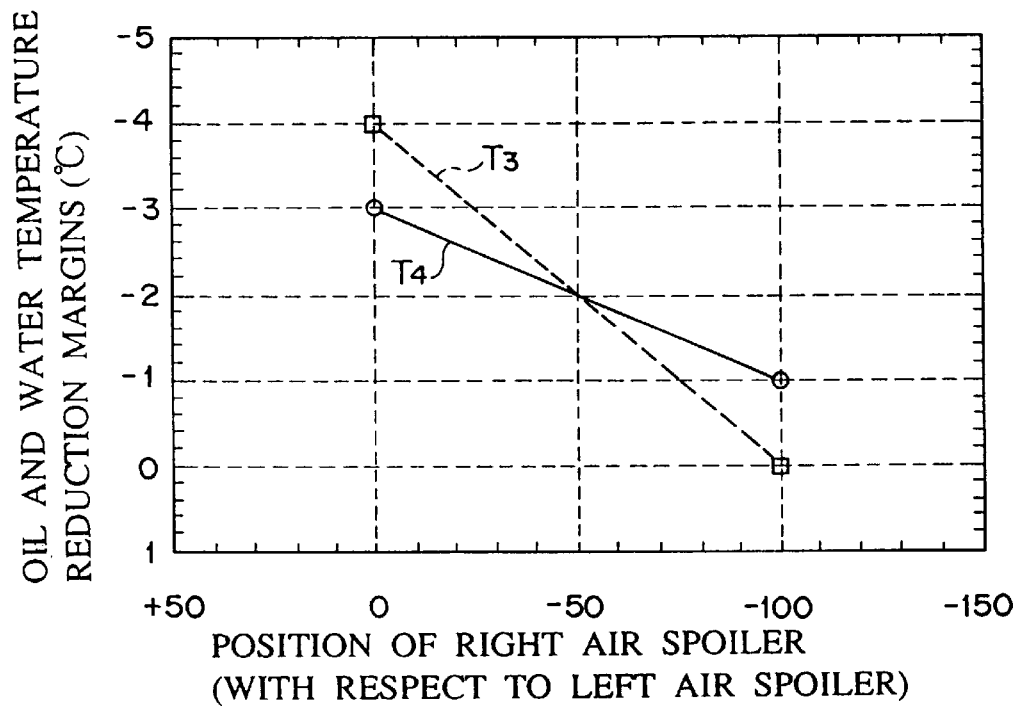
FIG. 4 is a diagram showing the relation between the relative positions of the left and right air spoilers, the reduction margin of the power steering oil temperature and the reduction margin of the radiator cooling water temperature.

The left and right air spoilers 5a, 6a are desirably aligned completely. Actually, however, the layout restrictions and the like make it difficult to completely eliminate the disparity (displacement) in the longitudinal direction of the vehicle body between the left and right air spoilers 5a, 6a. According to the present embodiment, the maximum tolerance of the disparity (displacement) between the left and right air spoilers 5a, 6a in the longitudinal direction of the vehicle body is set to ±125 mm. The reason is that an experiment, which has been conducted for determining the temperature reduction margin T3 of the power steering oil and the temperature reduction margin T4 of the radiator cooling water by changing the position of the right air spoiler 6a with respect to the position of the left air spoiler 5a in the longitudinal direction of the vehicle body with the protrusion H4 of the air spoilers 5a, 6a fixed to 60 mm, shows that the oil temperature and the water temperature drop effectively when the position of the right air spoiler 6a is distant not more than 125 mm with respect to the position of the left air spoiler 5a as shown in FIG. 4. Although FIG. 4 shows only the case in which the right air spoiler 6a is relocated toward the rear portion of the vehicle (in negative direction), a substantially similar result is obtained when the air spoiler 6a is relocated toward the front portion of the vehicle (in positive direction).

With the above-mentioned structure according to this embodiment, the laminar air flow occurring rearward under the under covers 5, 6 while the vehicle is running causes a negative pressure in the neighborhood of the lower surface of the under covers 5, 6. As a result, the hot air in the engine room 1 is exhausted from the rear ends of the under covers 5, 6 by the differential pressure between the interior of the engine room 1 and the rear ends of the under covers 5, 6. In the process, the symmetric arrangement of the rear ends of the under covers 5, 6 generates a negative pressure at positions aligned in the transverse direction of the vehicle in the vicinity of the rear ends of the under covers 5, 6. Consequently, the hot air in the engine room 1 is exhausted to the right and left positively substantially equally from the rear ends of the under covers 5, 6.

At the same time, the air spoilers 5a, 6a at the rear ends of the under covers 5, 6 reduce and quicken the air flow under the under covers 5, 6, so that a larger negative pressure is generated at the air spoilers 5a, 6a. The hot air in the engine room 1 thus is exhausted more positively.

As a result, the performance of the hot air exhaustion from the engine room 1 and hence the thermal environment in the engine room 1 are considerably improved, thereby improving the cooling effect of the radiator cooling water and the power steering oil.

Also, since the hot air is exhausted substantially equally from the rear ends of the left and right under covers 5, 6 as described above, the axial line of the air flow under the engine room 1 is not disturbed for a further improved aerodynamic characteristic.

Especially, according to the present embodiment, the ground clearance H3 of the air spoilers 5a, 6a is set slightly above the ground clearance H1 of the center member 2 in the range between the ground clearance H1 of the center member 2 and the ground clearance H2 of the front bumper 8 in such a position as to approach the underfloor laminar flow area A uniquely determined by the position of the lower surface of the front bumper 8. Therefore, the center member 2 can prevent the air spoilers 5a, 6a from being damaged by the interference which otherwise might occur with the road surface, while at the same time improving the effect of negative pressure generation by the air spoilers 5a, 6a for an improved hot air exhaustion performance as described above.

Also, the mooring wire 11b coupled diagonally down rearward to the tie-down hook 10 is not interfered with the air spoilers 5a, 6a during the vehicle transportation. Thus the air spoilers 5a, 6a are not damaged, resulting in the sense of a higher quality and reliability.

Further, the amount of protrusion H4 of the air spoilers 5a, 6a is set to at least 0.1 time larger than the length L1 from the front end of the front bumper 8 to the air spoilers 5a, 6a with the longitudinal deflection between the left and right air spoilers 5a, 6a set to not more than ±125 mm. Therefore, the temperature of the power steering oil and the radiator cooling water can be reduced more effectively.

Now, a second embodiment of the invention will be explained in detail with reference to the accompanying drawings. In the second embodiment, the same component parts as in the first embodiment are designated by the same reference numerals, respectively, and will not be described again.

Figure 5:
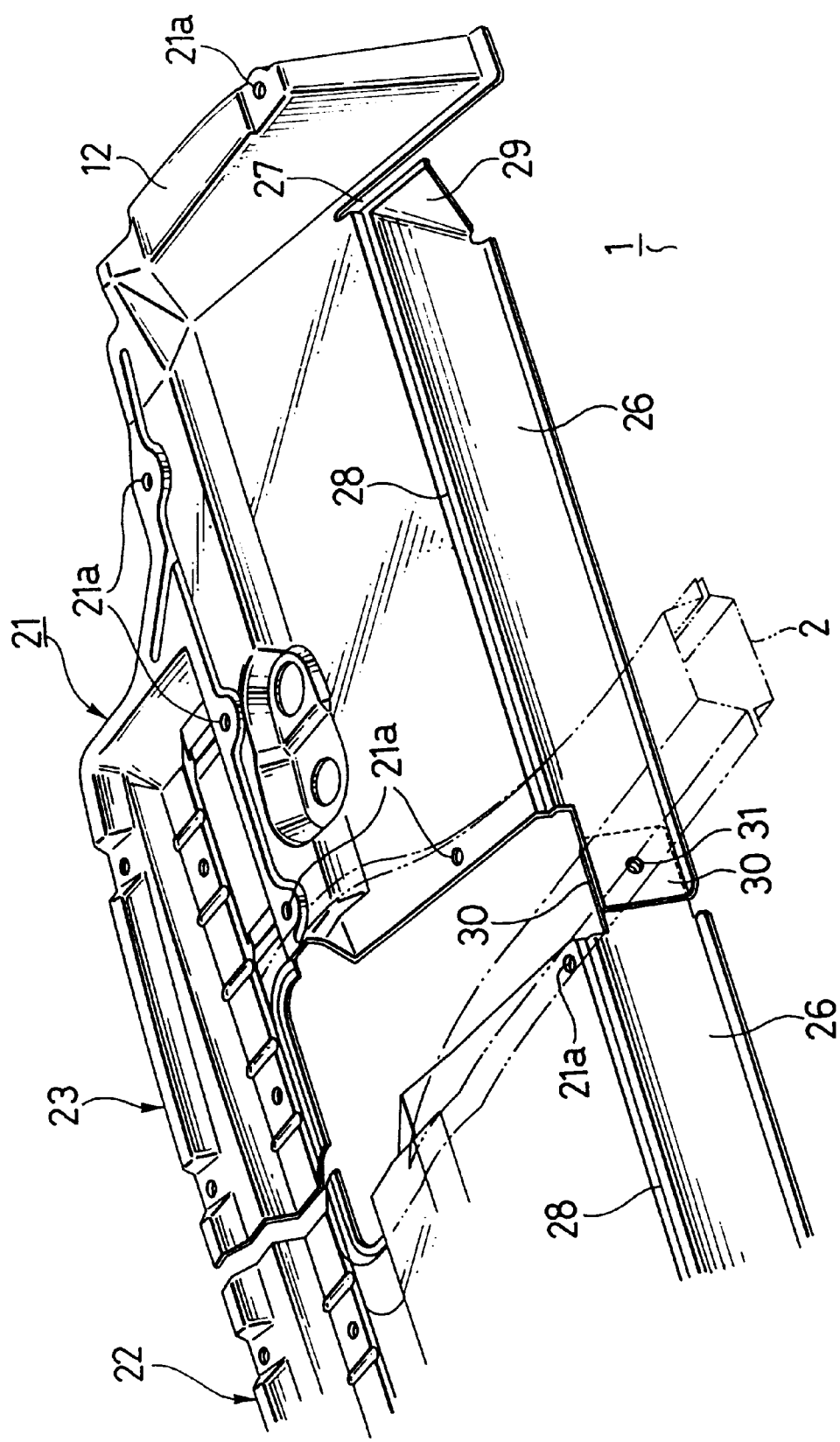
FIG. 5 is a perspective view of the front lower structure according to a second embodiment of the invention.
Figure 6:
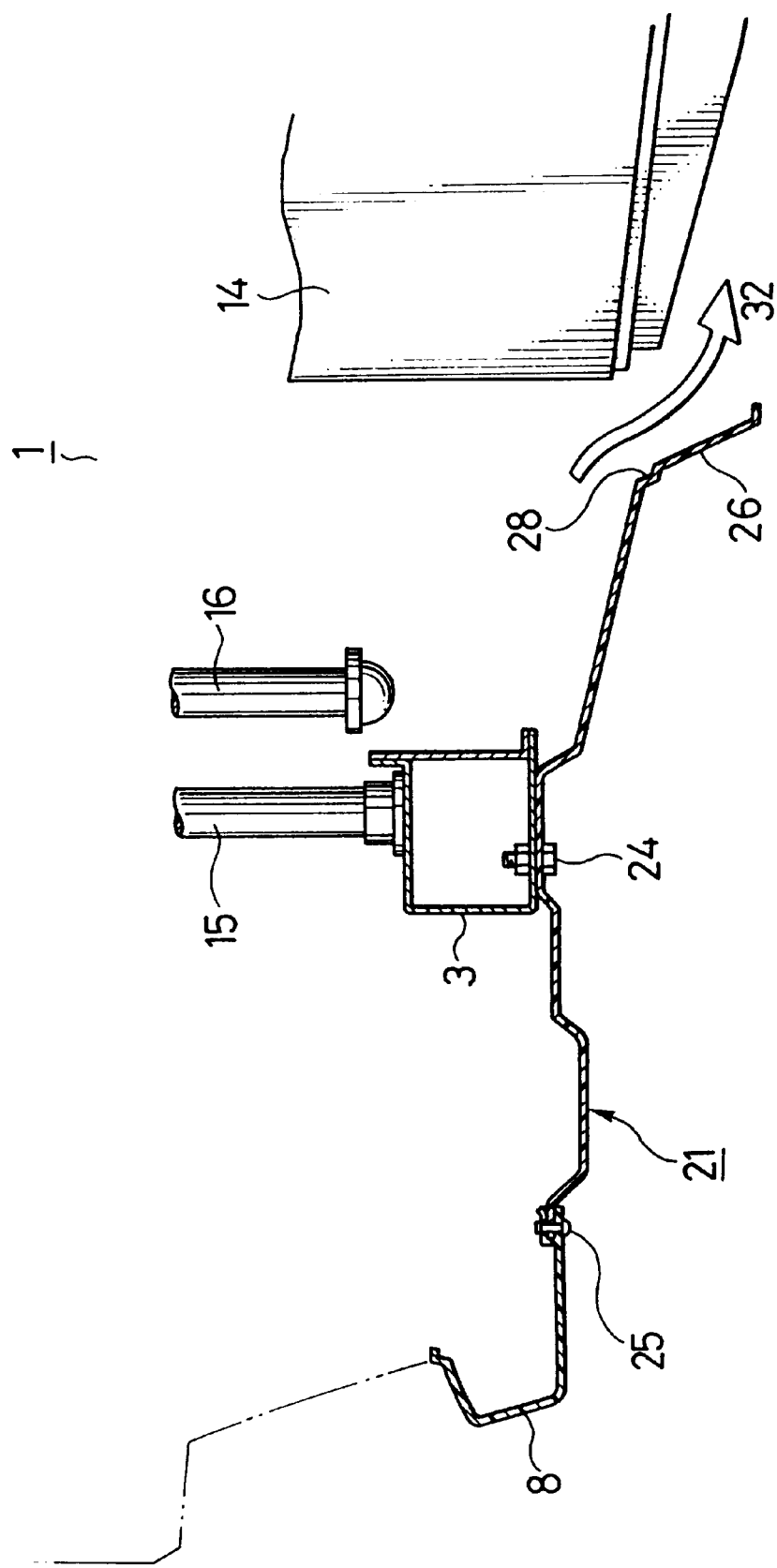
FIG. 6 is a sectional side view of the essential parts of the front lower structure shown in FIG. 5.
Figure 7:
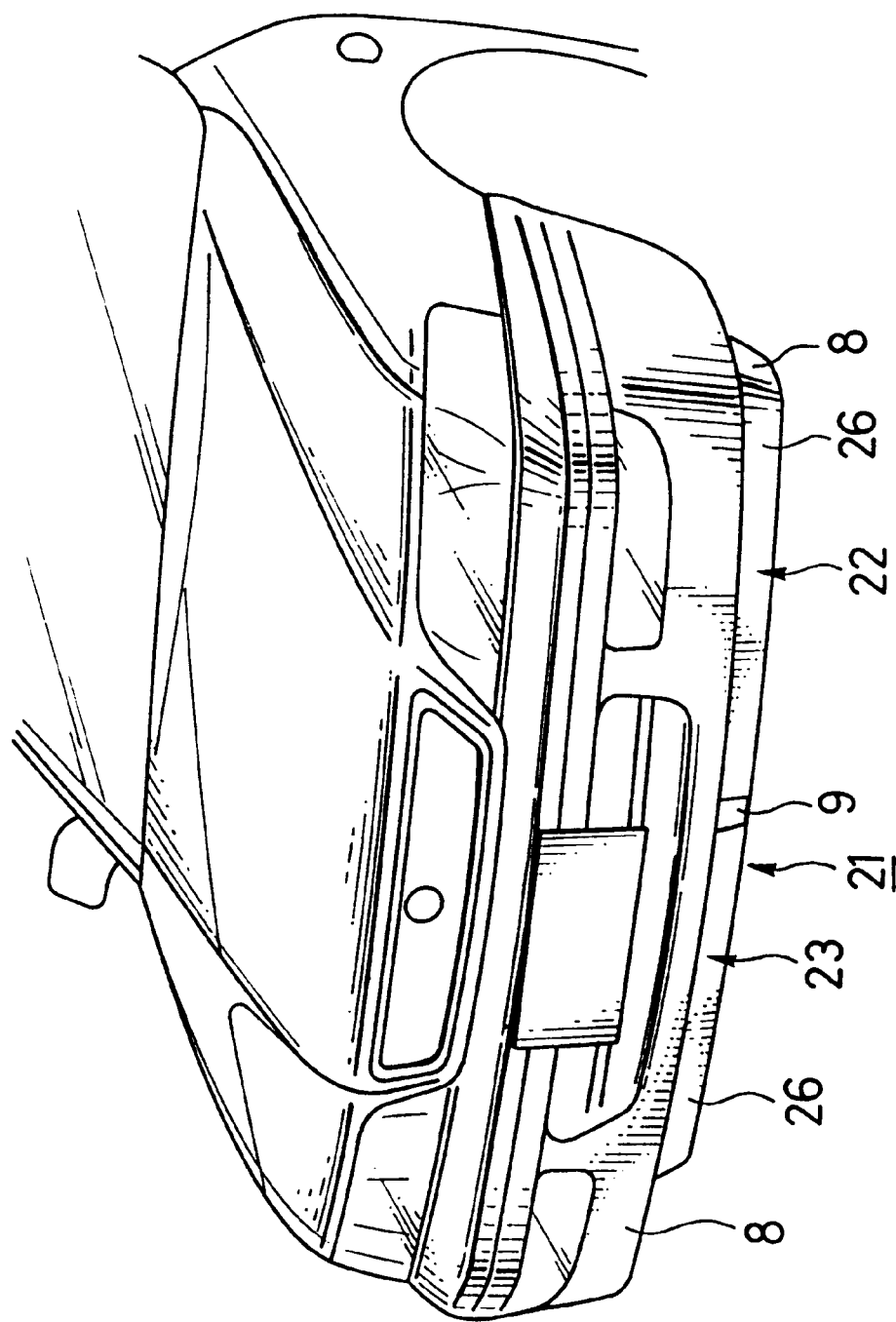
FIG. 7 is a perspective view of the front part of an automobile having the front lower structure shown in FIG. 5.

As shown in FIGS. 5 to 7, an under cover 21 according to the present embodiment is divided into left and right under covers 22, 23 on both sides of a center member 2.

The left and right under covers 22, 23 are formed of flat resin or steel plates and each have a splash guard 12 rising on the front wheel sides thereof not shown.

The left and right under covers 22, 23 have the front sides thereof securely fastened by bolts and nuts 24 to the lower surface of the first cross member 3 through the mounting holes 21a, respectively. The rear ends of the splash guards 12 are similarly securely fastened to the front side members not shown, and the rear ends thereof nearer to the vehicle center are fastened to the lower surface of the center member 2 through the mounting holes 21a. As shown in FIG. 6, the lower front end of the engine room 1 is enclosed by the left and right under covers 22, 23 in the range up to the neighborhood of the lower front portion of the engine 14, and each front edge thereof is fastened by a clip 25 to the lower edge of the front bumper 8.

The rear ends of the left and right under covers 22, 23 have the air spoilers 26, respectively, bent down at an appropriate angle. Also, the base of the rising portion of each of the splash guards 12, 12 is formed with a slit 27 extending forward of the base of the bent portion of the air spoilers 26.

According to this embodiment, a readily-bent portion 28 is formed at a position in the vicinity of the base of the bent portion of each of the air spoilers 26 of the left and right under covers 22, 23. Each readily-bent portion 28 is extended in the transverse direction of the vehicle behind a mounting point (mounting hole 21a) on the center member 2 and the forming end of the slit 27.

According to this embodiment, the readily-bent portion 28 is formed in steps so that the rising portion of the air spoilers 26 is formed one step lower than the remaining portion of the under covers 22, 23. The readily-bent portion 28 can be formed in some another way by embossing the bead thereof or otherwise.

Also, the front wheel sides of the air spoilers 26, i.e., the side edges thereof nearer to the splash guards 12 are each formed with a second splash guard 29 bent rearward for blocking the inward splash from the front wheels. The second splash guard 29 is extended straight under the splash guard 12.

Further, the side edges of the air spoilers 26, 26 on the central portion side of the vehicle body are formed with extensions 30, 30 under the center member 2. The extensions 30, 30 are overlapped longitudinally and coupled to each other by a screw 31.

With the above-mentioned structure according to this embodiment, the air flowing in under the under covers 22, 23 from the front portion of the vehicle body while it is running is reduced and increased in flow velocity by the air spoilers 26, 26 bent downward from the rear ends of the under covers 22, 23, thereby generating a high negative pressure in the neighborhood of the air spoilers 26, 26.

As a result, the differential pressure between the high negative pressure generated in the neighborhood of the air spoilers 26, 26 and the internal pressure of the engine room 1 can positively exhaust the high-pressure hot air of the engine room 1 by way of the rear ends of the under covers 22, 23, as shown by arrow 32 in FIG. 6. Consequently, the cooling performance of the coolers such as the air condenser 16 and the radiator 15 is improved without increasing the output of the cooling fan not shown, while at the same time improving the cooling effect of the other functional parts in the engine room as well as the engine 14.

Also, the base of the rising portion of each of the splash guards 12, 12 is formed with slits 27, 27 extending forward of the base of the bent portion of the air spoilers 26, 26. Even in the case where the air spoilers 26, 26 interfere with an obstacle on the road surface while the vehicle is moving backward, therefore, the sits 27, 27 allow the air spoilers 26, 26 to deflect freely in the longitudinal direction, so that the obstacle can be smoothly kept out of contact with the air spoilers 26, 26. As a result, the air spoilers 26, 26 are prevented from being damaged. Further, the under covers 22, 23 are prevented from breaking from the mounting point thereof with the center member 2, the front side members or the first cross member 3 providing the side portions of the vehicle body.

While the vehicle is running in rain, on the other hand, the splash flying from the front wheels not shown to the sides of the under covers 22, 23 is basically blocked by the splash guards 12, 12 and thus prevented from intruding the engine room 1. Further, the second splash guards 29, 29 bent rearward from the side edges of the side portions of the air spoilers 26, 26 block the intrusion of the splash into the engine room 1 from the sides of the air spoilers 26, 26. The functional parts in the engine room 1 thus are protected from inundation.

Also, the second splash guards 29, 29 formed bent on the side edges of the air spoilers 26, 26 can improve the strength of the side ends of the air spoilers 26, 26. Further, the side portions of the side ends of the air spoilers 26, 26 are covered by the second splash guards 29, 29 for an improved appearance.

Furthermore, according to this embodiment, in spite of the under cover 21 being divided into the left and right under covers 22, 23, the air spoilers 26, 26 are coupled to each other under the center member 2 through the extensions 30, 30. Therefore, the sense of continuity is attached to the air spoilers 26, 26 as viewed from the lower front portion for an improved external appearance.

The second embodiment can be applied to the first embodiment.

Specifically, the base of the rising portion of the splash guards 12 of the under covers 5, 6 according to the first embodiment shown in FIG. 1 is formed with a slit extending forward of the base of the bent portion of the air spoilers 5a, 6a. As a result, in addition to the effect obtained in the first embodiment, the damage to the air spoilers 5a, 6a and the breakage from the mounting portion of the under covers 5, 6 are avoided.

Further, the front wheel sides of the air spoilers 5a, 6a according to the first embodiment, i.e., the side edges of the air spoilers 5a, 6a nearer to the splash guards 12 are formed with the second splash guards 29 bent rearward. Therefore, the splash which otherwise might intrude the engine room 1 is blocked sideways of the air spoilers 5a, 6a, thereby preventing the functional parts in the engine room 1 from being inundated. The strength of the side ends of the air spoilers 5a, 6a is thus improved while at the same time improving the external appearance thereof.

Now, a third embodiment of the invention will be explained in detail with reference to the accompanying drawings.

Figure 8:
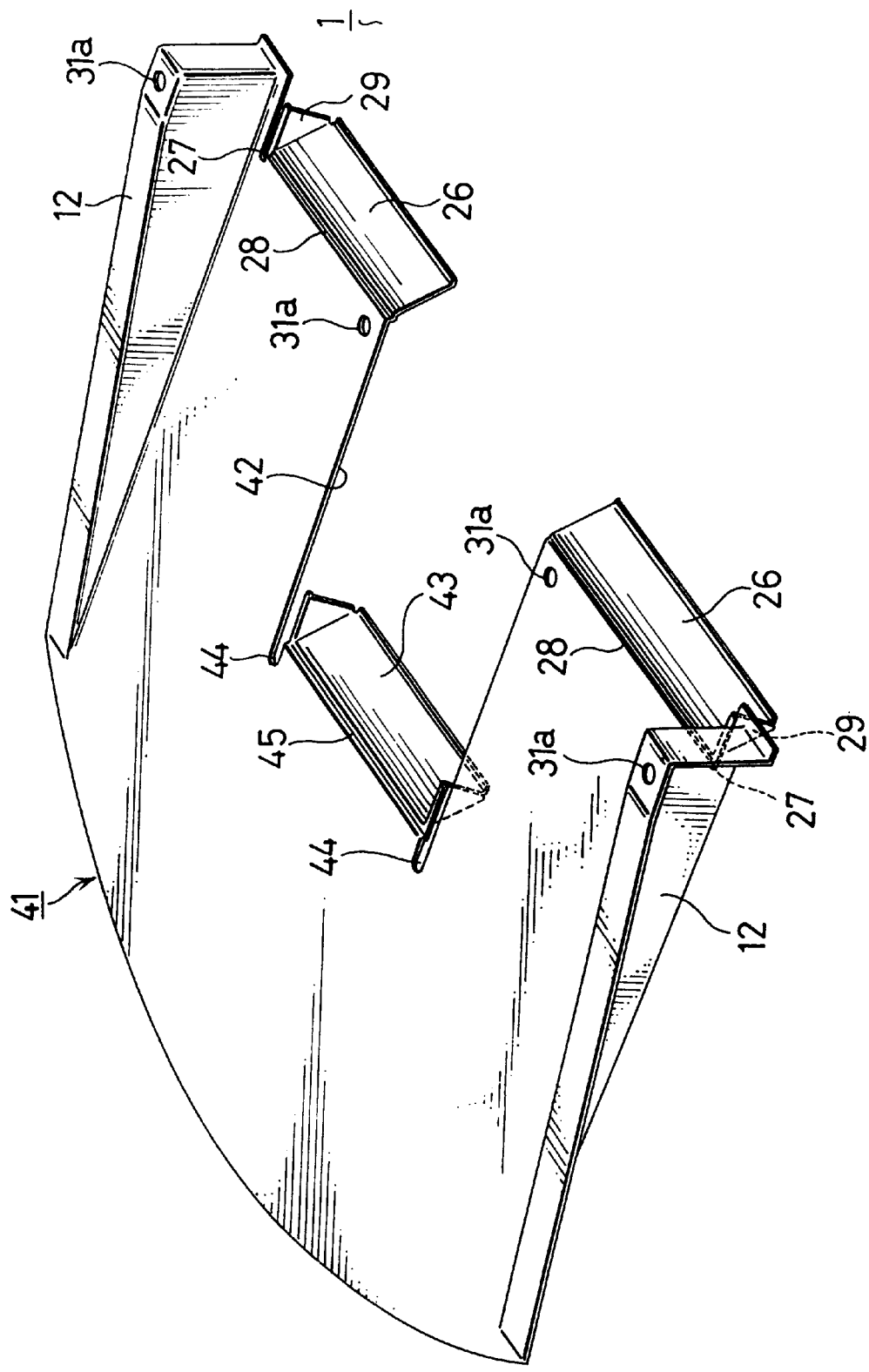
FIG. 8 is a perspective view showing the front lower structure according to a third embodiment of the present invention.

The third embodiment shown in FIG. 8, unlike the first and second embodiments, provides a front lower structure of a F.R (front-engine rear-drive) vehicle lacking the center member under the engine room 1. In the third embodiment, the same component parts as in the first and second embodiments are designated by the same reference numerals, respectively, and will not be described again.

The lower front end of the engine room 1 is enclosed by the left and right under covers 22, 23 in the range reaching the lower front neighborhood of the engine 14, and each front edge is fastened by a clip 25 to the lower edge of the front bumper 8.

As shown in FIG. 8, an under cover 41 is formed of a single flat plate enclosing the lower portion ranging from the front end of the engine room 1 to the engine-mounting portion. The rear central portion of the under cover 41 is formed with a recess 42 for receiving the lower side of the engine.

The under cover 41 is similar to the counterpart thereof in the second embodiment in that splash guards 12 are formed at the left and right sides thereof, in that air spoilers 26 are formed bent at the rear ends thereof, in that a slit 27 is formed at the base of the rising portion of each splash guard 12, in that a readily-bent portion 28 is formed in proximity to the base of the bent portion of each of the air spoilers 26, and in that second splash guards 29 are formed bent at the front wheel side edges of the air spoilers 26. The operation and the effects of the under cover 41, therefore, will not be described any more.

The front edge of the recess 42 of the under cover 41 is formed with a second air spoiler 43 bent down at substantially the same inclination angle and with substantially the same protrusion as the air spoilers 26.

Also, the extensions from the left and right side edges of the recess 42 of the under cover 41 are each formed with a second slit 44 extending forward of the base of the bent portion of the second air spoiler 43.

Further, a second readily-bent portion 45 extending in the transverse direction of the vehicle is formed in steps between the left and right second slits 44, 44 behind the forming ends thereof at a position in proximity to the base of the bent portion of the second air spoiler 43 of the under cover 41.

Consequently, this embodiment, in addition to the operation and effects of the second embodiment, has the functions of generating a high negative pressure around the second air spoiler 43 formed at the front edge of the recess 42 at the rear central portion of the under cover 41 for receiving the lower side portion of the engine. As a result, the hot air can be positively exhausted from the engine room 1 by way of the passage between the second air spoiler 43 and the lower front portion of the engine, thereby improving the cooling effect in the engine room 1.

Also, the second air spoiler 43 can be freely deflected in the longitudinal direction of the vehicle by the second slits 44, 44 formed on both sides thereof. Even in the case where the vehicle is moving back when the second air spoiler 43 may interfere with an obstacle on the road surface, therefore, the second air spoiler 43 can smoothly escape the obstacle. As a result, the damage to the second air spoiler 43 and the under cover 41 can be prevented. Further, the presence of the second readily-bent portion 45 further facilitates the longitudinal deflection of the second air spoiler 43 and therefore improves the effect of protecting the under cover 41 from damage.

What is claimed is:

1. An automotive front lower structure comprising:
    a drive unit mounting room;
    a power unit arranged in the drive unit mounting room;
    a center member arranged under a transversal central portion of said drive unit mounting room and extending in a longitudinal direction of a vehicle body, said power unit being mounted on the center member; and
    a pair of under covers arranged on left and right sides of the center member for enclosing a front lower side of said drive unit mounting room;
    wherein rear ends of said left and right under covers are bent downward to form transverse air spoilers; and
    said air spoilers are located substantially symmetrically about said center member and immediately in front of the power unit to exhaust heat within the drive unit mounting room.

2. An automotive front lower structure according to claim 1, wherein each of said air spoilers has a lower end located at a height between a lowest ground clearance of said center member and a lowest ground clearance of a front bumper.

3. An automotive front lower structure according to claim 2, wherein the lower ends of said air spoilers are located ahead of a portion of said center member corresponding to its lowest ground clearance.

4. An automotive front lower structure according to claim 1, wherein each of the pair of under covers includes a splash guard integrated with and rising from a front wheel side thereof.

5. An automotive front lower structure according to claim 1, further comprising a tie-down hook adapted for coupling to a mooring wire and arranged at a front end portion of the vehicle body, wherein lower ends of said air spoilers are located in such a position not to interfere with the mooring wire extending diagonally down rearward from the tie-down hook.

6. An automotive front lower structure according to claim 2, wherein said air spoilers each have a protrusion at least 0.1 time larger than the length from the front end of said front bumper to said air spoilers.

7. An automotive front lower structure according to claim 6, wherein each of said air spoilers is located closer to said center member than a rising portion of said splash guard.

8. An automotive front lower structure according to claim 6, wherein each splash guard has a rising portion having a base and each air spoiler has a bent portion having a base, and wherein each of the pair of under covers includes a slit formed at said base of said rising portion of said splash guard and extending forward from said base of said bent portion of said air spoiler.

9. An automotive front lower structure according to claim 8, wherein each of the pair of under covers includes a radially-bent portion formed in proximity to the base of the bent portion of said air spoiler and extending in the transverse direction of the vehicle rearward of a forming end of said slit.

10. An automotive front lower structure according to claim 8, wherein each of the pair of under covers includes a second splash guard formed bent rearward from a front wheel side edge of said air spoiler.

11. An automotive front lower structure according to claim 1, further comprising a first cross member extending in the transverse direction of the vehicle under a front of said drive unit mounting room and crossing a front of said center member, wherein each of the pair of under covers is attached to the first cross member, and wherein said air spoilers are arranged rearward of said first cross member and forward of said power unit.

12. An automotive front lower structure according to claim 1, wherein each of the pair of under covers has a longitudinal intermediate portion secured to the front cross member and a front end portion adapted to be secured to a front bumper on a front end of the vehicle.

13. An automotive front lower structure according to claim 1, wherein said left and right air spoilers are deflected from each other in the longitudinal direction of the vehicle by not more than ±125 mm.

14. An automotive front lower structure according to claim 1, wherein each of the pair of under covers has an extension under the center member, each said extension being overlapped longitudinally and coupled to the other extension.

15. An automotive front lower structure according to claim 1, wherein each of the pair of under covers has side edges opposing and apart from each other under cover, and said center member is exposed between the edges of said under covers.

16. A front lower structure for an automotive vehicle having a power unit, the structure comprising:

a drive unit mounting room;

a cross member extending in a transverse direction of the drive unit mounting room;

a center member fastened to the cross member and extending in a longitudinal direction of a vehicle body, a pair of under covers fastened to the cross member on left and right sides of the center member and enclosing a front lower side of the drive unit mounting room, wherein the under covers are mounted immediately in front of the power unit; and transverse air spoilers extending downwardly from rear ends of the left and right under covers and arranged rearward of the cross member, wherein the air spoilers are located substantially symmetrically about the center member and immediately in front of the power unit.

17. An automotive front lower structure according to claim 16, wherein each of the air spoilers has a lower end located at a height between a lowest ground clearance of the center member and a lowest ground clearance of a front bumper.

18. An automotive front lower structure according to claim 16, further comprising a tie-down hook adapted for coupling to a mooring wire and arranged at a front end portion of the vehicle body, wherein lower ends of the air spoilers are located such that they do not interfere with the mooring wire extending diagonally down rearward from the tie-down hook.

* * * * *

UNITED STATES PATENT AND TRADEMARK OFFICE
CERTIFICATE OF CORRECTION

PATENT NO. : 6,070,933
DATED : June 06, 2000
INVENTOR(S) : HIDETOSHI TSUKIDATE, et al.

It is certified that error appears in the above-identified patent and that said Letter Patent is hereby corrected as shown below:

On the Title page:

below Section [73], insert:

--[*] Notice: This patent issued on a continued prosecution application filed under 37 CFR 1.53(d), and is subject to the twenty year patent term provisions of 35 U.S.C. 154(a)(2).--

Signed and Sealed this

Eighth Day of May, 2001

*Attest:*

NICHOLAS P. GODICI

*Attesting Officer*  *Acting Director of the United States Patent and Trademark Office*